United States Patent
Sun et al.

(10) Patent No.: US 11,997,667 B2
(45) Date of Patent: May 28, 2024

(54) NON-NUMERICAL K1 FOR GROUP COMMON-PHYSICAL DOWNLINK CONTROL CHANNEL (GC-PDCCH) GRANT IN MULTIMEDIA BROADCAST MULTICAST SERVICE (MBMS)

(71) Applicant: QUALCOMM Incorporated, San Diego, CA (US)

(72) Inventors: Jing Sun, San Diego, CA (US); Xiaoxia Zhang, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/450,244

(22) Filed: Oct. 7, 2021

(65) Prior Publication Data

US 2022/0116956 A1 Apr. 14, 2022

Related U.S. Application Data

(60) Provisional application No. 63/090,135, filed on Oct. 9, 2020.

(51) Int. Cl.
*H04W 72/121* (2023.01)
*H04L 5/00* (2006.01)
(Continued)

(52) U.S. Cl.
CPC ......... *H04W 72/121* (2013.01); *H04L 5/0053* (2013.01); *H04W 72/1263* (2013.01); *H04W 72/23* (2023.01)

(58) Field of Classification Search
CPC ............... H04W 72/121; H04W 72/23; H04W 72/1263; H04L 5/0053
(Continued)

(56) References Cited

U.S. PATENT DOCUMENTS

2022/0007399 A1* 1/2022 Rastegardoost ...... H04L 5/0055
2022/0110092 A1 4/2022 Sun et al.
(Continued)

FOREIGN PATENT DOCUMENTS

WO WO-2021146702 A1 7/2021

OTHER PUBLICATIONS

International Search Report and Written Opinion—PCT/US2021/071788—ISA/EPO—dated Jul. 6, 2022.
(Continued)

*Primary Examiner* — Obaidul Huq
(74) *Attorney, Agent, or Firm* — Norton Rose Fulbright US LLP

(57) ABSTRACT

This disclosure provides systems, methods, and devices for wireless communication that support control of feedback reporting associated with broadcast or multicast transmissions based on indications of non-numerical K1 (NNK1) in associated transmission grants. In aspects, a base station transmits multicast transmission grants that include NNK1s to a set of UEs. The UEs in the set of UEs generate feedback codebooks, for the multicast transmissions, and holds transmission of the codebooks, based on the NNK1 received in the transmission grants until a report triggering event occurs. In aspects, the report triggering event includes receiving a subsequent multicast transmission grant with a valid K1, receiving a subsequent unicast transmission grant with valid K1, or receiving a UE-specific multicast retransmission grant. In aspects, the UEs use the valid K1 in the triggering event to determine a feedback resource to transmit the held feedback codebooks. Other aspects and features are also claimed and described.

30 Claims, 8 Drawing Sheets

(51) Int. Cl.
*H04W 72/1263* (2023.01)
*H04W 72/23* (2023.01)

(58) Field of Classification Search
USPC .......................................... 370/310, 328, 329
See application file for complete search history.

(56) References Cited

U.S. PATENT DOCUMENTS

| | | | |
|---|---|---|---|
| 2023/0023656 A1* | 1/2023 | Rastegardoost | H04W 72/0446 |
| 2023/0133506 A1* | 5/2023 | Wang | H04W 72/23 |

OTHER PUBLICATIONS

Nokia, et al., "Remaining Details on NR-U HARQ Scheduling and Feedback", 3GPP TSG RAN WG1 #99, R1-1912261, Reno, USA, Nov. 18-22, 2019, 20 Pages, XP051819976, Retrieved from the Internet: URL: https://ftp.3gpp.org/tsg_ran/WG1_RL1/TSGR1_99/Docs/R1-1912261.zip R1-1912261_HARQ.docx [Retrieved on Nov. 8, 2019] Section 3.1.

* cited by examiner

NON-NUMERICAL K1 FOR GROUP COMMON-PHYSICAL DOWNLINK CONTROL CHANNEL (GC-PDCCH) GRANT IN MULTIMEDIA BROADCAST MULTICAST SERVICE (MBMS)

CROSS-REFERENCE TO RELATED APPLICATIONS

This application claims the benefit of U.S. Provisional Patent Application No. 63/090,135, entitled, "NON-NUMERICAL K1 FOR GROUP COMMON-PHYSICAL DOWNLINK CONTROL CHANNEL (GC-PDCCH) GRANT IN MULTIMEDIA BROADCAST MULTICAST SERVICE (MBMS)," filed on Oct. 9, 2020, which is expressly incorporated by reference herein in its entirety.

TECHNICAL FIELD

Aspects of the present disclosure relate generally to wireless communication systems, and more particularly, to non-numerical K1 (NNK1) indications for group common-physical downlink control channel (GC-PDCCH) transmissions in multimedia broadcast multicast service (MBMS).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a user equipment (UE) from a base station, a plurality of multicast transmission grants addressed to a plurality of UEs, including the UE. Each of the plurality of multicast transmission grants schedules a multicast transmission and includes a non-numeric feedback timing indicator (NNK1) for acknowledgement/negative-acknowledgement (ACK/NACK) feedback associated with a respective multicast transmission. The method further includes receiving, from the base station, a first multicast transmission associated with a first multicast transmission grant of the plurality of multicast transmission grants, determining, by the UE, a feedback codebook including ACK/NACK for the first multicast transmission for reporting to the base station, holding, by the UE, reporting to the base station of the feedback codebook including the ACK/NACK for the first multicast transmission until a report triggering event is determined to occur, and determining, by the UE, whether the report triggering event has occurred. The method further includes, in response to a determination that the report triggering event has occurred, determining, by the UE, a feedback resource for reporting the feedback codebook to the base station based at least in part on a feedback timing indicator (K1) associated with the triggering event, and transmitting, by the UE, the feedback codebook including the ACK/NACK for the first multicast transmission to the base station on the determined feedback resource.

In an additional aspect of the disclosure, an apparatus (e.g., a UE) configured for wireless communication is disclosed. The apparatus includes at least one processor, and a memory coupled to the at least one processor. The at least one processor is configured to receive, by the UE from a base station, a plurality of multicast transmission grants addressed to a plurality of UEs, including the UE. Each of the plurality of multicast transmission grants schedules a multicast transmission and includes an NNK1 for ACK/NACK feedback associated with a respective multicast transmission. The at least one processor is further configured to receive, from the base station, a first multicast transmission associated with a first multicast transmission grant of the plurality of multicast transmission grants, determining, by the UE, a feedback codebook including ACK/NACK for the first multicast transmission for reporting to the base station, holding, by the UE, reporting to the base station of the feedback codebook including the ACK/NACK for the first multicast transmission until a report triggering event is determined to occur, and determining, by the UE, whether the report triggering event has occurred. The at least one processor is further configured to, in response to a determination that the report triggering event has occurred, determine, by the UE, a feedback resource for reporting the feedback codebook to the base station based at least in part on a K1 associated with the triggering event, and transmit, by the UE, the feedback codebook including the ACK/NACK for the first multicast transmission to the base station on the determined feedback resource.

In an additional aspect of the disclosure, an apparatus configured for wireless communication is disclosed. The apparatus includes means for receiving, by a UE from a base station, a plurality of multicast transmission grants addressed to a plurality of UEs, including the UE. Each of the plurality of multicast transmission grants schedules a multicast transmission and includes an NNK1 for ACK/NACK feedback associated with a respective multicast transmission. The apparatus further includes means for receiving, from the base station, a first multicast transmission associated with a first multicast transmission grant of the plurality of multicast transmission grants, determining, by the UE, a feedback codebook including ACK/NACK for the first multicast transmission for reporting to the base station, holding, by the UE, reporting to the base station of the feedback codebook including the ACK/NACK for the first multicast transmission until a report triggering event is determined to occur, and determining, by the UE, whether the report triggering event has occurred. The apparatus further includes means for, in response to a determination that the report triggering event has occurred, determining, by the UE, a feedback resource for reporting the feedback codebook to the base station based at least in part on a K1 associated with the triggering event, and transmitting, by the UE, the feedback codebook including the ACK/NACK for the first multicast transmission to the base station on the determined feedback resource.

In an additional aspect of the disclosure, a non-transitory computer-readable medium stores instructions that, when executed by a processor, cause the processor to perform operations including receiving, by a UE from a base station, a plurality of multicast transmission grants addressed to a plurality of UEs, including the UE. Each of the plurality of multicast transmission grants schedules a multicast transmission and includes an NNK1 for ACK/NACK feedback associated with a respective multicast transmission. The operations further include receiving, from the base station, a first multicast transmission associated with a first multicast transmission grant of the plurality of multicast transmission grants, determining, by the UE, a feedback codebook including ACK/NACK for the first multicast transmission for reporting to the base station, holding, by the UE, reporting to the base station of the feedback codebook including the ACK/NACK for the first multicast transmission until a report triggering event is determined to occur, and determining, by the UE, whether the report triggering event has occurred. The operations further include further include, in response to a determination that the report triggering event has occurred, determining, by the UE, a feedback resource for reporting the feedback codebook to the base station based at least in part on a K1 associated with the triggering event, and transmitting, by the UE, the feedback codebook including the ACK/NACK for the first multicast transmission to the base station on the determined feedback resource.

In an additional aspect of the disclosure, a method of wireless communication includes transmitting, by a base station, a plurality of multicast transmission grants addressed to a plurality of UEs. Each of the plurality of multicast transmission grants schedules a multicast transmission and includes an NNK1 for ACK/NACK feedback associated with a respective multicast transmission. The method further includes transmitting a first multicast transmission associated with a first multicast transmission grant of the plurality of multicast transmission grants, transmitting, subsequent to transmitting the first multicast transmission associated with a first multicast transmission grant, a triggering transmission grant to a UE of the plurality of UEs, and receiving a feedback codebook from the UE. The feedback codebook includes ACK/NACK feedback for the first multicast transmission in feedback resource.

In an additional aspect of the disclosure, an apparatus (e.g., a base stations) configured for wireless communication is disclosed. The apparatus includes at least one processor, and a memory coupled to the at least one processor. The at least one processor is configured to transmit, by the base station, a plurality of multicast transmission grants addressed to a plurality of UEs. Each of the plurality of multicast transmission grants schedules a multicast transmission and includes an NNK1 for ACK/NACK feedback associated with a respective multicast transmission. The at least one processor is further configured to transmit a first multicast transmission associated with a first multicast transmission grant of the plurality of multicast transmission grants, to transmit, subsequent to transmitting the first multicast transmission associated with a first multicast transmission grant, a triggering transmission grant to a UE of the plurality of UEs, and to receive a feedback codebook from the UE. The feedback codebook includes ACK/NACK feedback for the first multicast transmission in feedback resource.

In an additional aspect of the disclosure, an apparatus configured for wireless communication is disclosed. The apparatus includes means for transmitting, by a base station, a plurality of multicast transmission grants addressed to a plurality of UEs. Each of the plurality of multicast transmission grants schedules a multicast transmission and includes an NNK1 for ACK/NACK feedback associated with a respective multicast transmission. The apparatus further includes means for transmitting a first multicast transmission associated with a first multicast transmission grant of the plurality of multicast transmission grants, transmitting, subsequent to transmitting the first multicast transmission associated with a first multicast transmission grant, a triggering transmission grant to a UE of the plurality of UEs, and receiving a feedback codebook from the UE. The feedback codebook includes ACK/NACK feedback for the first multicast transmission in feedback resource.

In an additional aspect of the disclosure, a non-transitory computer-readable medium stores instructions that, when executed by a processor, cause the processor to perform operations including transmitting, by a base station, a plurality of multicast transmission grants addressed to a plurality of UEs. Each of the plurality of multicast transmission grants schedules a multicast transmission and includes an NNK1 for ACK/NACK feedback associated with a respective multicast transmission. The operations further include transmitting a first multicast transmission associated with a first multicast transmission grant of the plurality of multicast transmission grants, transmitting, subsequent to transmitting the first multicast transmission associated with a first multicast transmission grant, a triggering transmission grant to a UE of the plurality of UEs, and receiving a feedback codebook from the UE. The feedback codebook includes ACK/NACK feedback for the first multicast transmission in feedback resource.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
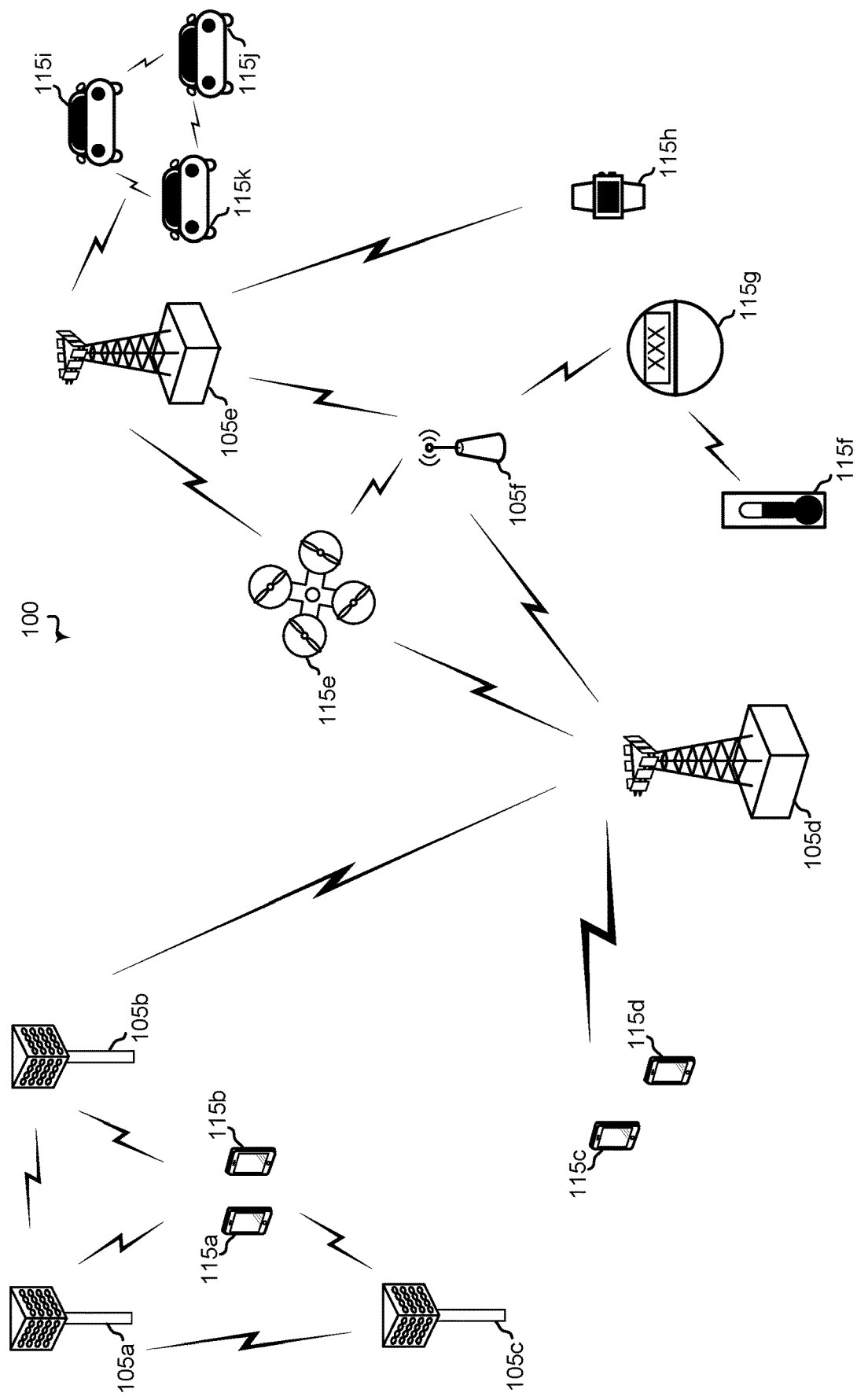
FIG. 1 is a block diagram illustrating details of an example wireless communication system according to one or more aspects.

The detailed description set forth below, in connection with the appended drawings is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support management and control of feedback reporting associated with broadcast and multicast transmissions in a wireless system. In particular, aspects of the present disclosure relate to techniques for controlling feedback reporting of group common-physical downlink shared channel (GC-PDSCH) transmissions in multimedia broadcast multicast service (MBMS) based on indications of non-numerical K1 (NNK1) in associated GC-physical downlink control channel (GC-PDCCH) transmission grants. For example, in aspects, a base station may configure GC-PDCCH transmission grants transmitted to a plurality of UEs to include an NNK1. The UEs in the plurality of UEs may receive GC-PDSCH transmissions associated with respective GC-PDCCH transmission grants, and may generate feedback, such as an acknowledgement/negative-acknowledgement (ACK/NACK) feedback in a feedback codebook, for the GC-PDSCH transmissions. In aspects, a UE may hold transmission of the feedback codebook for a GC-PDSCH transmission, based on the NNK1 received in the GC-PDCCH transmission grant associated with the GC-PDCCH transmission. In aspects, a UE may hold transmission of the feedback codebook for a GC-PDSCH transmission until a report triggering event occurred or is determined to occur. In some aspects, the report triggering event may include receiving a subsequent GC-PDCCH transmission grant with a valid K1 (e.g., a K1 that is not an NNK1), receiving a valid K1 in a subsequent unicast PDCCH transmission grant, or receiving a UE-specific GC-PDCCH retransmission grant. In aspects, the UE receiving the valid K1 in the triggering event may use the valid K1 to determine a physical uplink control channel (PUCCH) resource in which to transmit the held feedback codebook transmission.

Particular implementations of the subject matter described in this disclosure may be implemented to realize one or more of the following potential advantages or benefits. In some aspects, the present disclosure provides techniques for feedback reporting of a GC-PDSCH transmission based on an NNK1 in an associated GC-PDCCH transmission grant. In some aspects, the disclosed techniques may enable an MBMS system to employ NNK1 indications, and may allow a base station to more efficiently control feedback reporting for multicast transmissions. For example, where a base station is unable to determine a timing resource for scheduling a multicast transmission feedback from a UE, the base station, implementing techniques herein disclosed, may still grant the multicast transmission and may indicate an NNK1, which a receiving UE may use to hold transmission of the associated feedback until the base station may trigger transmission of the held feedback. This advantageous technique allows more flexibility of multicast and broadcast transmissions in a wireless system.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz–7.125 GHz) and FR2 (24.25 GHz–52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz–300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)—chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
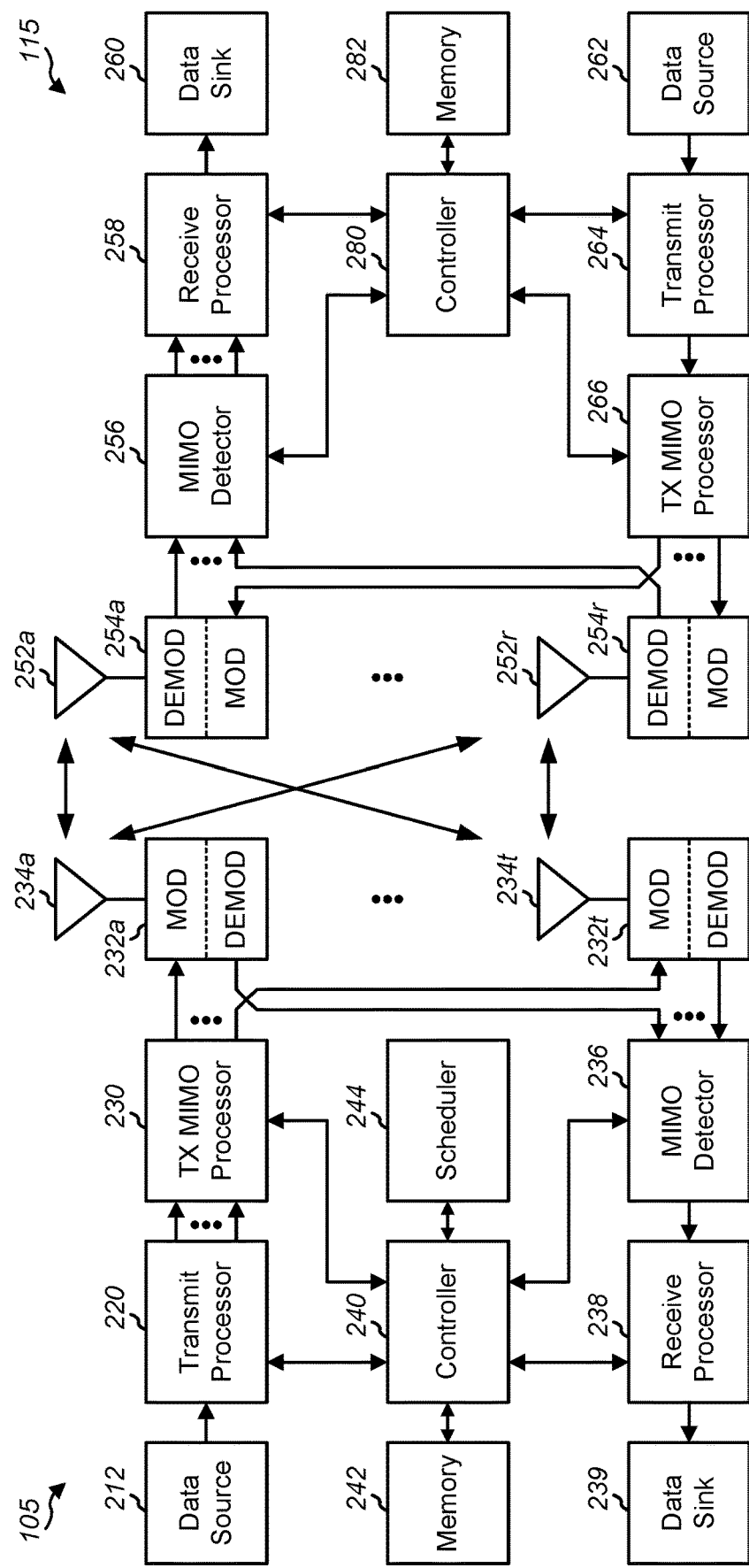
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5 and 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Various aspects of the present disclosure relate to techniques for feedback reporting of group common-physical downlink shared channel (GC-PDSCH) transmissions in multimedia broadcast multicast service (MBMS) based on indications of non-numerical K1 (NNK1) in associated GC-physical downlink control channel (GC-PDCCH) transmission grants. For example, in aspects, a base station may configure a GC-PDCCH transmission grant transmitted to a plurality of user equipments (UEs) to include an NNK1. The UEs in the plurality of UEs may receive GC-PDSCH transmissions associated with respective GC-PDCCH transmission grants, and may generate feedback, such as an acknowledgement/negative-acknowledgement (ACK/NACK) feedback in a feedback codebook, for the GC-PDSCH transmissions. In aspects, the UEs may hold transmission of the feedback codebook for a GC-PDSCH transmission, based on the NNK1 received in the GC-PDCCH transmission grant associated with the GC-PDCCH transmission. In aspects, the UEs may hold transmission of the feedback codebook for a GC-PDSCH transmission until a report triggering event occurred or is determined to occur. In some aspects, the report triggering event may include receiving a subsequent GC-PDCCH transmission grant with a valid K1 (e.g., a K1 that is not an NNK1), receiving a valid K1 in a subsequent unicast PDCCH transmission grant, or receiving a UE-specific GC-PDCCH retransmission grant. In aspects, the UE receiving the valid K1 in the triggering event may use the valid K1 to determine a physical uplink control channel (PUCCH) resource in which to transmit the held feedback codebook transmission.

In current MBMS systems, a base station may be configured to transmit broadcast and multicast messages to a plurality of UEs. In these current systems, a base station may address a single multicast transmission to multiple UEs. The multiple UEs may receive the multicast transmission, and may be configured to provide feedback associated with the transmission. In particular, in examples of MBMS systems, a base station may transmit a plurality of GC-PDCCH transmissions, which may be addressed to the plurality of UEs. In such examples, the base station may configure each GC-PDCCH transmission of the plurality of GC-PDCCH transmissions to include a grant of a GC-PDSCH transmission. It is noted that in the present description, a GC-PDCCH transmission including a grant of a GC-PDSCH transmission may be referred to as a GC-PDCCH transmission grant. In such examples of current MBMS systems, each GC-PDCCH transmission grant transmitted by the base station may include a feedback timing indicator (K1) and a physical uplink control channel (PUCCH) resource indicator (PM). Typically, a UE receiving a GC-PDCCH transmission grant may use the included K1 and PM to determine a resource (e.g., a PUCCH resource) for providing ACK/NACK feedback for a GC-PDSCH transmission associated with the GC-PDCCH transmission grant. For example, a UE may use the indicated K1 and PRI in a GC-PDCCH transmission grant to determine a PUCCH resource in which to report feedback for a GC-PDSCH transmission associated with the GC-PDCCH transmission grant.

Some examples of MBMS systems may support UE-specific feedback for MBMS transmissions. For example, following the example above, after receiving a GC-PDSCH transmission from a base station, a set of UEs may provide feedback to the base station indicating a NACK for the GC-PDSCH transmission. In such example, the base station may retransmit (or schedule to retransmit) the GC-PDSCH transmission for which the NACK was provided by the UE, or the set of UEs. In this example, the base station may address the GC-PDSCH retransmission specifically to the UE, or the set of UEs that reported the NACK feedback.

In some examples, a feedback process space may include the process by which a UE generates and reports feedback for a transmission to the base station, and may also include the process by which a base station schedules and receives the feedback for the transmission from a UE, or set of UEs. In some examples of MBMS systems, the feedback process space for GC-PDSCH transmissions may be separated from the feedback space processes for unicast transmissions for individual UEs. In such examples, an individual UE may report a feedback codebook (such as a hybrid automatic repeat request (HARQ) feedback codebook) for a GC-PDSCH transmission using a feedback space process that may be separate from the feedback space process used by the individual UE to report a feedback codebook for a unicast PDSCH transmission. In these examples, the UE may not combine, for example the UE may not multiplex, the GC-PDSCH feedback codebook with the unicast PDSCH feedback codebook when the UE reports the feedback of the GC-PDSCH transmission and the feedback of the unicast GC-PDSCH transmission. In these examples, since the base station may address a GC-PDCCH transmission to a plurality of UEs, the K1 and PRI indication in the GC-PDCCH transmission grant may apply to all UEs in the plurality of UEs receiving the GC-PDCCH transmission grant. In such examples, if all UEs in the plurality of UEs transmit a feedback report at the same time (such as over the same PUCCH resource based on the K1 and PRI indications), this would create a transmission conflict and the wireless system performance would be greatly affected. In some MBMS systems, different UEs may be configured to interpret the PRI indications in the GC-PDCCH transmission grant differently, in which case different UEs may use different PUCCH resources to transmit the feedback report for the GC-PDSCH transmission associated with the GC-PDCCH transmission grant. However, configuring different UEs to interpret the PRI indication differently is very difficult for a base station.

To address some of the challenges above, in some example wireless communication systems, a base station may transmit different, separate, and subsequent GC-PDCCH transmissions to trigger the feedback report for the GC-PDSCH transmission. However, example wireless communication systems also suffer from increased control overhead due to the use of the separate GC-PDCCH transmission. Moreover, in examples in which the multicast transmission is addressed to a relatively small number of UEs, in which case only a small number of UEs may be transmitting feedback for the GC-PDSCH transmission to the base station, a separate triggering GC-PDCCH transmission may not be justifiable.

As noted above, in some examples of MBMS systems, a base station may not know, or may not be able to determine, a resource (e.g., time) for scheduling a feedback from a UE for a GC-PDSCH transmission. For example, in some wireless communication systems, a PDSCH transmission (such as a GC-PDSCH transmission) may be scheduled towards the end of a channel occupancy time (COT). In this case, it is possible that the ACK/NACK feedback for the PDSCH transmission may not be able to be scheduled in the same COT. In this example, the base station may indicate a K1 value to the UE that may result in a determined feedback resource outside of the COT, and this may risk the UE, which may have to perform a listen before talk (LBT) procedure, failing the LBT and thus not be able to transmit the PUCCH in which the feedback report for the PDSCH transmission may be scheduled.

As will be appreciated, an indication of an NNK1 may address the above problems. For example, a base station may include an NNK1 in the first PDCCH transmission grant. Although the UE may not use the NNK1 to determine a feedback resource (e.g., the NNK1 is a non-valid K1 indication) for reporting the feedback for the PDSCH transmission, the NNK1 may serve as an indication by the base station to the UE, that the UE is to hold the PDSCH feedback. The UE may then hold the PDSCH feedback until the base station triggers the UE to transmit the PDSCH feedback. For example, in a next COT, the base station may schedule a second PDSCH transmission grant that includes control information (e.g., a downlink control information (DCI) message) with a valid K1 value. The UE may use the valid K1 value in the second PDCCH transmission grant to determine a feedback resource for the first PDSCH transmission and for a second PDSCH transmission associated with the first PDCCH transmission grant. In this example, the UE may multiplex the feedback for the first PDSCH transmission with the feedback for the second PDSCH to generate a feedback codebook. The UE may then transmit the feedback codebook to the base station in the feedback resource determined based on the valid K1.

Figure 3:
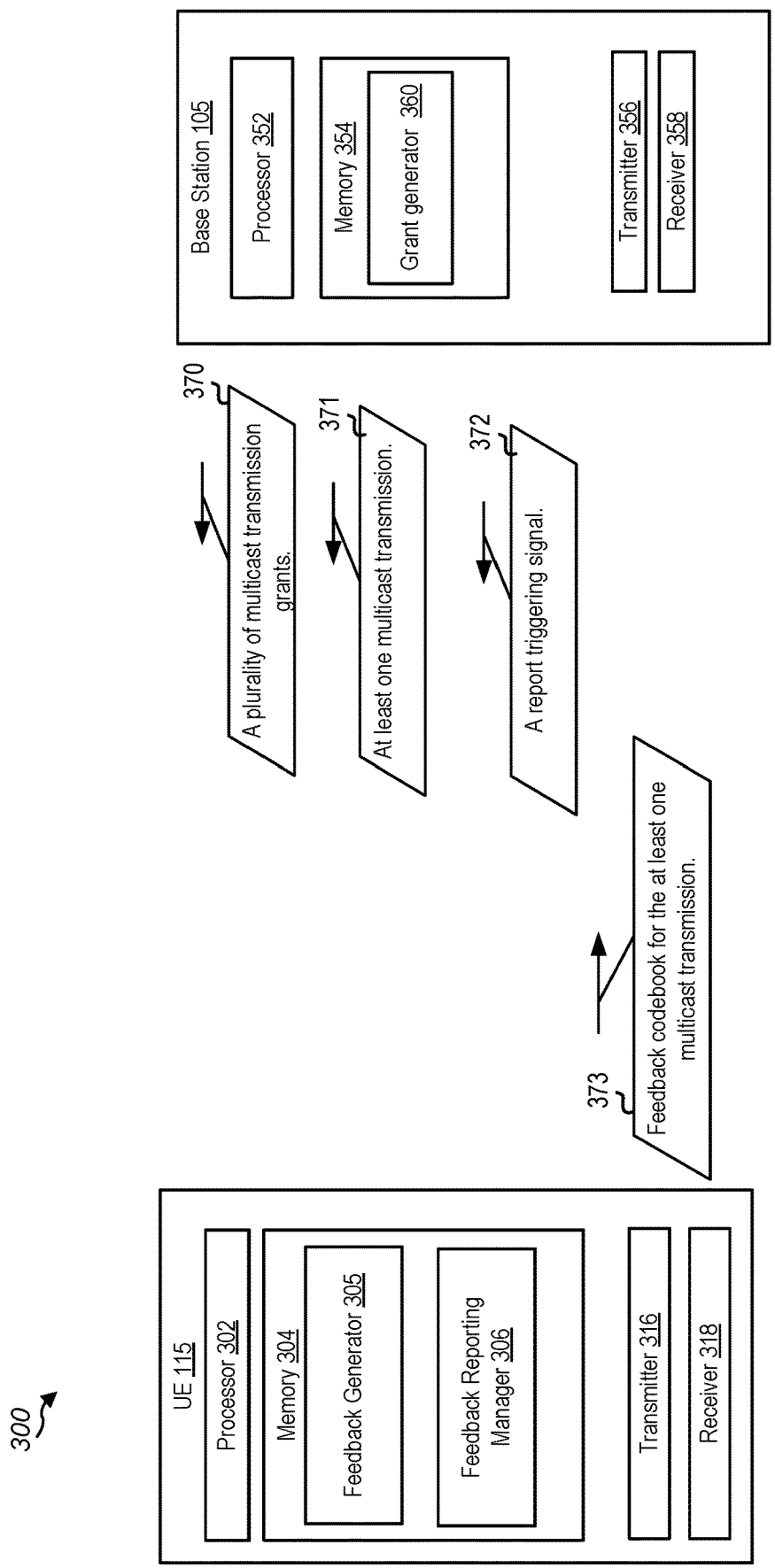
FIG. 3 is a block diagram of an example wireless communications system that supports control of feedback reporting of GC-PDSCH transmissions based on NNK1s indicated in associated GC-PDCCH transmission grants.

FIG. 3 is a block diagram of an example wireless communications system 300 that supports control of feedback reporting of GC-PDSCH transmissions based on NNK1s indicated in associated GC-PDCCH transmission grants. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store feedback generator 305 and feedback reporting manager 306.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Feedback generator 305 may be configured to generate feedback, such as ACK/NACK feedback, for GC-PDSCH transmissions received from base station 105. In aspects, feedback generator 305 may generate a feedback report for each received GC-PDSCH transmissions. In aspects, feedback generator 305 may include the feedback report of a GC-PDSCH transmission in a feedback codebook. In some aspects, the feedback codebook generated by feedback generator 305 may include feedback for more than one GC-PDSCH transmission. For example, a plurality of GC-PDCCH transmission grants may include control information that feedback reporting manager 306 may use to determine, such as based on a valid K1 received by UE 115 from base station 105, a feedback resource for transmitting feedback for a plurality of GC-PDSCH transmissions granted by the plurality of GC-PDCCH transmission grants. In this example, the feedback resource determined by feedback reporting manager 306 may be the same for more than one GC-PDSCH transmission. In this case, feedback generator 305 may be configured to include the feedback for those more than one GC-PDSCH transmissions in the feedback codebook to be transmitted in the determined resource. In some aspects, feedback generator 305 may include the feedback for the more than one GC-PDSCH transmissions in the feedback codebook by multiplexing the feedback for the more than one GC-PDSCH transmissions together.

Feedback reporting manager 306 may be configured to hold transmission feedback for GC-PDSCH transmissions received from base station 105 based on NNK1 indications. For example, UE 115 may receive a GC-PDCCH transmission grant granting a GC-PDSCH transmission. Feedback reporting manager 306 may determine that the GC-PDCCH transmission grant includes an NNK1. In this example, feedback reporting manager 306 may hold transmission of feedback for the GC-PDSCH transmission. In aspects, feedback generator 305 may be configured to determine that a report triggering event has occurred. For example, feedback generator 305 may determine that valid K1 has been received in accordance with a triggering event. For example, reporting manager 306 may determine that subsequent GC-PDCCH transmission grant with a valid K1 has been received, that a valid K1 in a subsequent unicast PDCCH transmission grant has been received, or that a UE-specific GC-PDCCH retransmission grant has been received. In this case, feedback generator 305 may be configured to release the hold of the feedback for the GC-PDSCH transmission associated with the GC-PDCCH transmission grant that included the NNK1. Releasing the hold may include transmitting the feedback for the GCC-PDSCH transmission. In aspects, releasing the hold may also include determining a feedback resource, based on the valid K1, for transmitting the held feedback.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242. Memory 354 includes or is configured to store grant generator 354.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

Grant generator 360 may be configured to construct and generate GC-PDCCH transmission grants that may include an NNK1. In aspects, base station 105 may determine that an NNK1 is to be included in a GC-PDCCH transmission grant. For example, base station 105 may not know, or may not be able to determine, a PUCCH resource for scheduling a feedback from UE 115 for a GC-PDSCH transmission, or for a plurality of GC-PDSCH transmissions. In this case, grant generator 360 may include an NNK1 in the GC-PDCCH transmission grant associated with the GC-PDSCH transmission. Grant generator 360 may also be configured to generate a report triggering event that may cause UE 115 to release a held feedback for a GC-PDSCH transmission.

During operation of wireless communications system 300, base station 105 may transmit a message 370 including a plurality of multicast transmission grants. For example, base station 105 may transmit a plurality of GC-PDCCH transmissions, and each GC-PDCCH transmission may grant an associated GC-PDSCH transmission. In aspects, the base station 105 may address the GC-PDCCH transmission grants (and the associated GC-PDSCH transmissions) to a plurality of UEs, which may include UE 115. The base station 105 may configure the GC-PDCCH transmission grants to include configuration and parameters for the associated GC-PDSCH transmissions. For example, one or more of the GC-PDCCH transmission grants may include an NNK1 in each GC-PDCCH transmission grant. In such example, base station 105 may include the NNK1 in response to a determination, by base station 105, that a feedback resource (e.g., a PUCCH resource) for transmitting feedback for GC-PDSCH transmissions associated with the one or more of the GC-PDCCH transmission grants is not able to be determined, as described above.

UE 115, which may be part of the plurality of UEs to which the plurality of GC-PDCCH transmission grants is addressed, may receive the plurality of GC-PDCCH transmission grants. In some implementations, UE 115 may determine that one or more of the GC-PDCCH transmission grants includes an NNK1. In this example, UE 115 may determine to, and may hold transmission of feedback for the GC-PDSCH transmissions associated with the one or more GC-PDCCH transmission grants that include an NNK1. In some implementations, UE 115 may determine to hold feedback for the GC-PDSCH transmissions until a report triggering event has been determined to occur. In aspects, holding reporting to the base station of the feedback for the GC-PDSCH transmissions may include the UE foregoing, or not transmitting the feedback codebook including ACK/NACK for the GC-PDSCH transmissions. In this manner, the NNK1 serves as an indicator to the UE, from the base station, to hold feedback of a respective GC-PDSCH transmission.

In some aspects, UE 115 may hold transmission of feedback for the GC-PDSCH transmissions associated with the one or more GC-PDCCH transmission grants that include an NNK1 for a period of time. Once the period of time expires, the UE may transmit the feedback for the GC-PDSCH transmissions. In some aspects, the period of time may include the occurrence of the report triggering event, or may be a period of time after reception of a GC-PDSCH transmission. In aspects, the period of time may be based on UE 115 holding transmission of feedback for the GC-PDSCH transmissions until a report triggering event occurs.

During operations, base station 105 may transmit a message 371 that may include at least one multicast transmission associated with at least one multicast transmission grant of the plurality of multicast transmission grants. For example, base station 105 may transmit one or more GC-PDSCH transmissions granted in the plurality of GC-PDCCH transmission grants. In aspects, the plurality of UEs, including UE 115, may receive the one or more GC-PDSCH transmissions. In some implementations, the one or more GC-PDSCH transmissions transmitted by the base station may be associated with GC-PDCCH transmission grants that include an NNK1. In some aspects, the one or more GC-PDSCH transmissions associated with GC-PDCCH transmission grants that include an NNK1 may be transmitted by base station 105 at different times.

In aspects, UE 115 may determine a feedback (such as a hybrid automatic repeat request (HARQ) feedback) for each of the one or more GC-PDSCH transmissions transmitted by the base station that are associated with GC-PDCCH transmission grants that include an NNK1. For example, UE 115 may receive a first GC-PDSCH transmission from base station 105. The first GC-PDSCH transmission may be associated with a first GC-PDCCH transmission grant that includes an NNK1. In this example, UE 115 may generate a first feedback codebook including feedback (e.g., ACK/NACK feedback) for the first GC-PDSCH transmission. In aspects, UE 115 may receive a second GC-PDSCH transmission from base station 105. The second GC-PDSCH transmission may be associated with a second GC-PDCCH transmission grant that includes an NNK1. In this example, the UE 115 may generate a second feedback codebook including feedback (e.g., ACK/NACK feedback) for the second GC-PDSCH transmission. In this example, the UE may hold transmission of the first and second feedback codebooks to the base station in response to determining that the first and second GC-PDCCH transmission grants each include an NNK1. As noted above, once the hold is released and a valid K1 is received, a feedback resource may be determined for transmitting the first and second feedback codebooks to the base station. In this case, the first and second feedback codebooks may be multiplexed together. In aspects, as noted above, UE 115 may hold transmission of feedback for the GC-PDSCH transmissions until a report triggering event has been determined to occur.

During operation of wireless communication system 300, base station 105 may transmit a message 372 that may include a reporting triggering signal. In aspects, the reporting triggering signal may indicate to UE 115 that a triggering event has occurred, or may be used by UE 115 to determine that a triggering event has occurred. In aspects, UE 115, in response to determining that a triggering event has occurred, based on receiving the report triggering signal, may release the hold on transmission of feedback for the GC-PDSCH transmissions associated with GC-PDCCH transmission grants that include an NNK1. In aspects, releasing the hold on transmission of feedback for the GC-PDSCH transmissions may include transmitting a respective feedback codebook in a feedback resource (e.g., a PUCCH resource) determined by the UE based on the report triggering signal.

During operation of wireless communication system 300, UE 115 may transmit a message 373 that may include the feedback codebook for the GC-PDSCH transmissions associated with GC-PDCCH transmission grants that include an NNK1. In aspects, the feedback codebook for the GC-PDSCH transmissions associated with GC-PDCCH transmission grants that include an NNK1 may be transmitted to base station 105 in the resource determined by the UE based on a valid K1 included in the report triggering signal from the base station.

As noted above, UE 115 may not be able to determine a feedback resource, based on the NNK1, for transmitting the feedback for GC-PDSCH transmissions associated with GC-PDCCH transmission grants that include the NNK1. In this sense, the NNK1 in a GC-PDCCH transmission grant may serve as an indicator to UE 115, from base station 105, to hold feedback of a respective GC-PDSCH transmission, but may not be a valid K1 for determining a feedback resource in which to report the feedback. On the other hand, the report triggering signal received from base station 105 may include a valid K1, which UE 115 may use to determine a feedback resource for transmitting the previously held feedback for GC-PDSCH transmissions associated with GC-PDCCH transmission grants that include the NNK1.

In some implementations, the report triggering signal may be a report triggering event described above. For example, in some implementations, the report triggering event may include receiving a subsequent GC-PDCCH transmission grant with a valid K1 (e.g., a K1 that is not an NNK1). In these implementations, for example, base station may transmit another GC-PDCCH transmission grant, subsequent to the GC-PDCCH transmission grants that include the NNK1. The other GC-PDCCH transmission grant may include a valid K1, instead of an NNK1. In aspect, the other GC-PDCCH transmission grant that includes the valid K1 may be a multicast transmission of the plurality of multicast transmissions transmitted by baes station 105.

In these implementations, a downlink assignment index (DAI) field may be configured in the GC-PDCCH transmission grants. The DAI field may be configured to maintain a count of GC-PDCCH transmission grants that include an NNK1, until a GC-PDCCH transmission grant that includes a valid K1 is transmitted. The DAI counter may be reset in response to the GC-PDCCH transmission grant that includes the valid K1 being transmitted.

In these implementations, the UE may determine a feedback resource (e.g., a PUCCH resource), based on the valid K1, in which to transmit a feedback codebook for not only the GC-PDSCH transmission associated with the GC-PDCCH transmission grant with the valid K1, but also for transmitting the held feedback codebooks for the GC-PDSCH transmissions associated with GC-PDCCH transmission grants that include the NNK1. In these implementations, the PUCCH resource determined by UE 115 based on the valid K1 may be used to transmit a combined feedback codebook from UE 115. In aspects, the combined feedback codebook may be generated by UE 115 by multiplexing the feedback codebooks for the GC-PDSCH transmissions associated with GC-PDCCH transmission grants that include the NNK1 with the feedback codebook for the GC-PDSCH transmission associated with the GC-PDCCH transmission grant with the valid K1.

In some implementations, the report triggering event may include base station 105 transmitting, and/or UE 115 receiving, a unicast PDCCH transmission grant with a valid K1 (e.g., a K1 that is not an NNK1) granting a unicast PDSCH transmission. In these aspects, the unicast PDCCH transmission grant maybe addressed specifically to UE 115 and no other UE. In these implementations, for example, base station 105 may transmit a unicast PDCCH transmission grant, subsequent to the GC-PDCCH transmission grants that include the NNK1, to UE 115. The unicast PDCCH transmission grant may include a valid K1, instead of an NNK1.

In these implementations, the UE may determine a feedback resource (e.g., a PUCCH resource), based on the valid K1, in which to transmit a feedback codebook for not only the unicast PDSCH transmission associated with the unicast PDCCH transmission grant with the valid K1, but also for transmitting the held feedback codebooks for the GC-PDSCH transmissions associated with GC-PDCCH transmission grants that include the NNK1. In these implementations, the PUCCH resource determined by UE 115 based on the valid K1 may be used to transmit a combined feedback codebook from UE 115. In aspects, the combined feedback codebook may be generated by UE 115 by multiplexing the feedback codebooks for the GC-PDSCH transmissions associated with GC-PDCCH transmission grants that include the NNK1 with the feedback codebook for the unicast PDSCH transmission associated with the unicast PDCCH transmission grant with the valid K1. In some aspects, multiplexing the feedback codebooks for the GC-PDSCH transmissions and the unicast PDSCH transmission may include concatenating the feedback codebooks.

In these implementations, the unicast PDCCH transmission grant granting the unicast PDSCH transmission may have a DCI 1_1 or DCI 1_2 format. In these cases, the priority of the unicast PDSCH transmission grant may be determined before the feedback codebooks for the GC-PDSCH transmissions and the feedback codebook of the unicast PDSCH transmission are multiplexed. In these implementations, multiplexing the feedback codebooks for the GC-PDSCH transmissions and the feedback codebook of the unicast PDSCH transmission may be performed based on the priority associated with the unicast PDSCH transmission. For example, UE 115 may be allowed to multiplex the feedback codebooks for the GC-PDSCH transmissions with a low priority (e.g., priority 0) unicast PDSCH transmission. In this case, the feedback codebooks for the GC-PDSCH transmissions and the feedback codebook of the low priority unicast PDSCH transmission may be multiplexed together and transmitted in the PUCCH resource determined based on the valid K1 in the unicast PDCCH transmission grant. On the other hand, UE 115 may be configured to not allow multiplexing of the feedback codebooks for the GC-PDSCH transmissions with a high priority (e.g., priority 1) unicast PDSCH transmission. In this case, the feedback codebooks for the GC-PDSCH transmissions and the feedback codebook of the high priority unicast PDSCH transmission may not be multiplexed together. In this case, the held transmission of the feedback codebooks for the GC-PDSCH transmissions may be dropped instead.

In some implementations, the report triggering event may include base station 105 transmitting, and/or UE 115 receiving, a UE-specific retransmission of a GC-PUSCH transmission. As described above, after receiving a GC-PDSCH transmission from a base station, a UE may provide feedback to the base station indicating a NACK for the GC-PDSCH transmission. In this case, the base station may retransmit (or schedule to retransmit) the GC-PDSCH transmission for which the NACK was provided by the UE. In a GC-PDSCH retransmission, the base station may address the GC-PDSCH retransmission specifically to the UE that reported the NACK feedback.

In these implementations of wireless communication system 300, base station 105 may transmit a GC-PDSCH retransmission to UE 115. The GC-PDSCH retransmission may be granted in a GC-PDCCH retransmission grant transmitted by base station 105 to UE 115. In aspects, the GC-PDCCH retransmission granting the GC-PDSCH retransmission to UE 115 may include control information (e.g., a DCI) with a valid K1 (e.g., a K1 that is not an NNK1). In these aspects, the GC-PDCCH retransmission grant maybe addressed specifically to UE 115 and no other UE. In these implementations, for example, base station 105 may transmit a GC-PDCCH retransmission grant, subsequent to the GC-PDCCH transmission grants that include the NNK1, to UE 115.

In these implementations, the UE may determine a feedback resource (e.g., a PUCCH resource), based on the valid K1, in which to transmit a feedback codebook for not only the GC-PDSCH retransmission associated with the GC-PDCCH retransmission grant with the valid K1, but also for transmitting the held feedback codebooks for the GC-PDSCH transmissions associated with GC-PDCCH transmission grants that include the NNK1. In these implementations, the PUCCH resource determined by UE 115 based on the valid K1 may be used to transmit a combined feedback codebook from UE 115. In aspects, the combined feedback codebook may be generated by UE 115 by multiplexing the feedback codebooks for the GC-PDSCH transmissions associated with GC-PDCCH transmission grants that include the NNK1 with the feedback codebook for the GC-PDSCH retransmission associated with the GC-PDCCH retransmission grant with the valid K1. In some aspects, multiplexing the feedback codebooks for the GC-PDSCH transmissions and the GC-PDSCH retransmission may include concatenating the feedback codebooks.

In some aspects, the GC-PDCCH retransmission grant may not actually include valid retransmission grant. For example, the GC-PDCCH retransmission grant may include a DCI with an invalid frequency domain resource assignment. In these aspects, the GC-PDCCH retransmission grant may be intended, and may be used by the UE, to as a report triggering event to cause the UE to report the held feedback codebooks for the GC-PDSCH transmissions associated with GC-PDCCH transmission grants that include the NNK1.

Figure 4A:
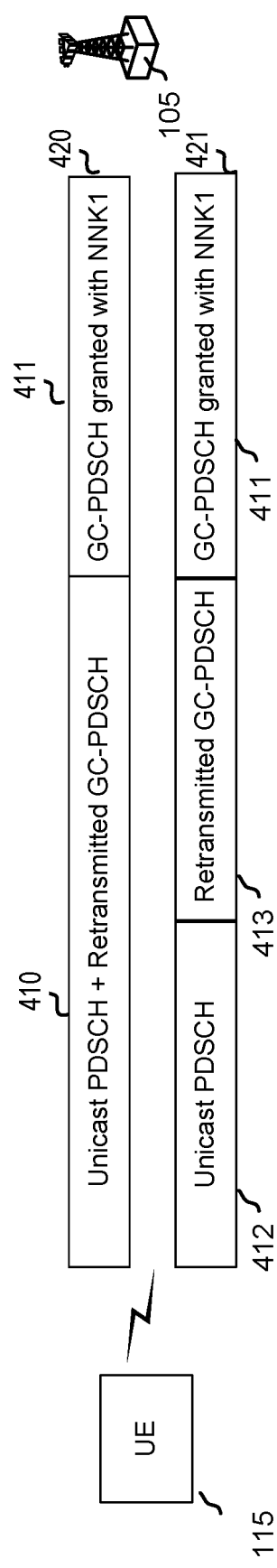
FIG. 4A is a diagram illustrating examples of feedback codebooks multiplexed in accordance with aspects of the present disclosure.

In implementations, as noted above, UE 115 may multiplex the feedback codebooks for the GC-PDSCH transmissions associated with GC-PDCCH transmission grants that include the NNK1 with the feedback codebook for the transmission associated with the transmission grant with the valid K1. FIG. 4A is a diagram illustrating examples of feedback codebooks multiplexed in accordance with aspects of the present disclosure. In particular, FIG. 4A shows a multiplexed codebook that may be transmitted in a PUCCH resource determined based on a valid K1. In implementations where a unicast PDCCH transmission grant may be used as a report triggering event, determining the size of the feedback codebook to be reported (e.g., the multiplexed feedback codebook) may be based on the size of the feedback codebooks of the unicast PDSCH feedback codebook and the MBMS feedback codebook. In aspects, the size of the unicast PDSCH feedback codebook may be determined based on legacy techniques. The size of the MBMS feedback may be determined by the size of the GC-PDSCH transmission feedback codebook, and by a size of a feedback codebook for UE-specific GC-PDSCH retransmissions. In some aspects, UE-specific GC-PDSCH retransmissions feedback may share a same DAI space with unicast feedback process. In these cases, a DAI field may be included in the UE-specific GC-PDCCH retransmission grant. FIG. 4A shows two alternatives for multiplexing the various feedback codebooks in the case of a share DAI space. In particular, in one alternative multiplexed feedback codebook 420 may include a combined, integrated feedback codebook in which the ACK/NACK feedback for the unicast PDSCH transmission and the ACK/NACK feedback for the UE-specific GC-PDSCH retransmission 411 are integrated together (e.g., multiplexed) into a single combined feedback codebook 410. In this example, the held feedback codebook 411 including the ACK/NACK feedback for the GC-PDSCH transmissions associated with GC-PDCCH transmission grants that include the NNK1 may be concatenated to combined feedback codebook 410. In another alternative illustrated in FIG. 4A, multiplexed feedback codebook 421 may include separated feedback codebooks in which feedback codebook 412 including ACK/NACK feedback for the unicast PDSCH transmission, feedback codebook 413 including ACK/NACK feedback for the UE-specific GC-PDSCH retransmission, and held feedback codebook 411 including the ACK/NACK feedback for the GC-PDSCH transmissions associated with GC-PDCCH transmission grants that include the NNK1 may be concatenated to each other.

Figure 4B:
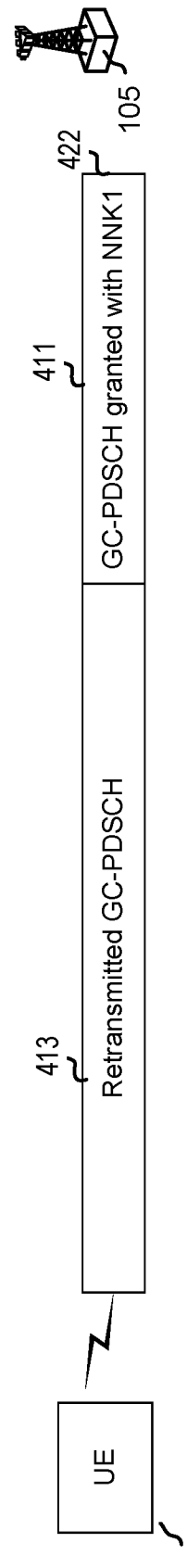
FIG. 4B is a diagram illustrating another example of feedback codebooks multiplexed in accordance with aspects of the present disclosure.

FIG. 4B is a diagram illustrating another example of feedback codebooks multiplexed in accordance with aspects of the present disclosure. In particular, FIG. 4B shows a multiplexed codebook that may be transmitted in a PUCCH resource determined based on a valid K1. In implementations where a UE-specific GC-PDCCH retransmission grant may be used as a report triggering event, determining the size of the feedback codebook to be reported (e.g., the multiplexed feedback codebook) may be based on the size of the feedback codebooks of the unicast PDSCH feedback codebook and the MBMS feedback codebook. In these cases, a DAI field may be included in the UE-specific GC-PDCCH retransmission grant. The DAI included in the UE-specific GC-PDCCH retransmission grant may be separate from the DAI in the unicast PDSCH grant. In these aspects, GC-PDCCH transmission grants may include another separate DAI that may be used by a UE to discover a missing GC-PDCCH. In this case, the MBMS feedback codebook 422 may include a concatenation of feedback codebook 413 including ACK/NACK feedback for the UE-specific GC-PDSCH retransmission 413, and held feedback codebook 411 including the ACK/NACK feedback for the GC-PDSCH transmissions associated with GC-PDCCH transmission grants that include the NNK1.

Figure 5:
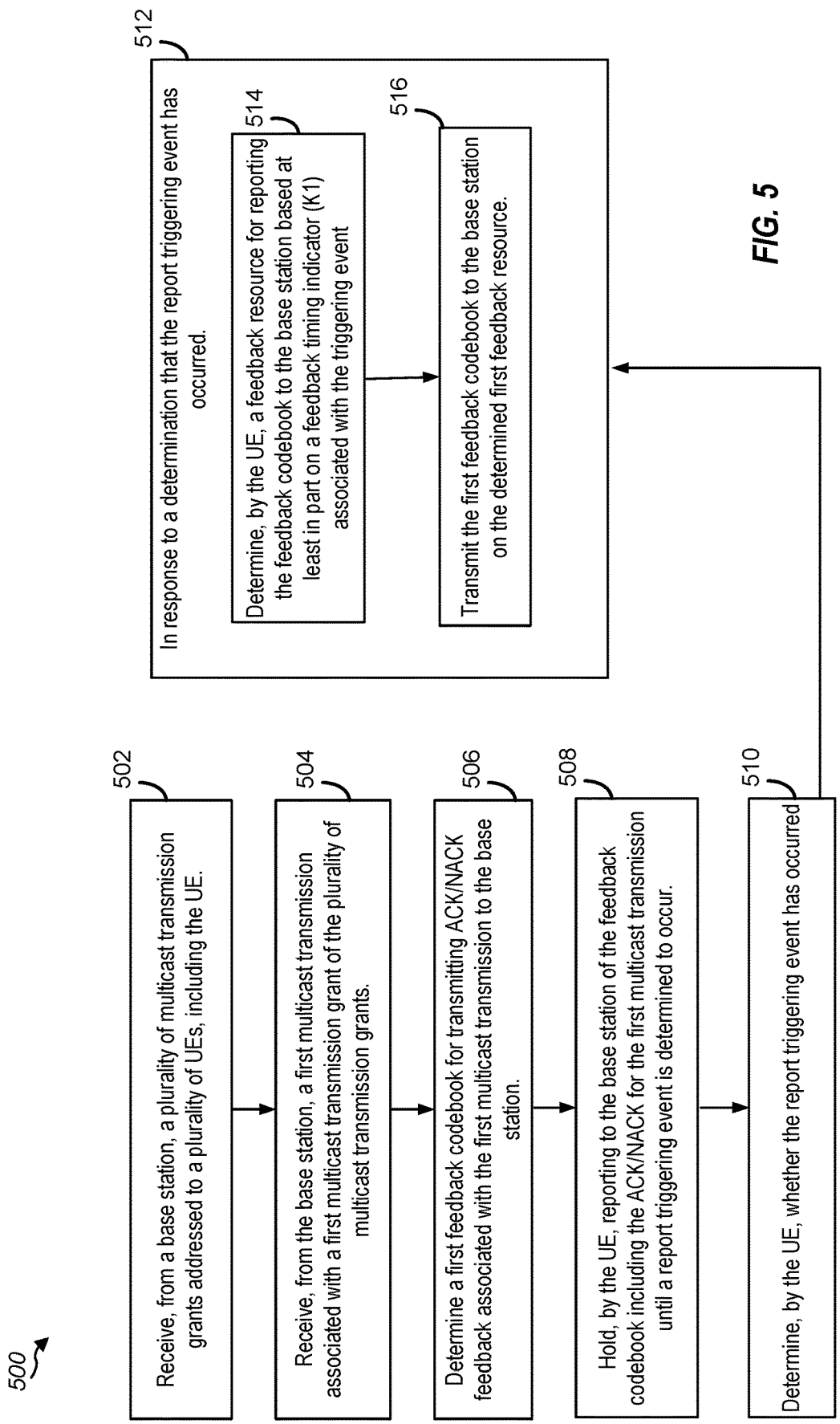
FIG. 5 is a flow diagram illustrating an example process 500 that supports reporting of feedback of GC-PDSCH transmissions based on NNK1s indicated in associated GC-PDCCH transmission grants according to some aspects of the present disclosure.

FIG. 5 is a flow diagram illustrating an example process 500 that supports reporting of feedback of GC-PDSCH transmissions based on NNK1s indicated in associated GC-PDCCH transmission grants according to some aspects of the present disclosure. Operations of the process 500 may be performed by a UE, such as the UE 115 described above with reference to FIGS. 1-4 or a UE as described with reference to FIG. 7. For example, example operations (also referred to as "blocks") of the process 500 may enable the UE 115 to perform feedback for multicast (such as MBMS) transmissions in accordance with aspects of the present disclosure.

In block 502, a UE (e.g., UE 115) receives a plurality of multicast transmission grants addressed to a plurality of UEs including the UE 115. For example, the UE 115 may receive a plurality of GC-PDCCH transmissions, each GC-PDCCH transmission granting a GC-PDSCH transmission. In aspects, each of the multicast transmission grants may include an NNK1. In implementations, the UE may not use the NNK1 to determine a feedback resource (e.g., the NNK1 may not be a non-valid K1 indication) for reporting the feedback for GC-PDSCH transmissions, but instead, the NNK1 may serve as an indication by the base station to the UE, that the UE is to hold transmission of the GC-PDSCH feedback.

In block 504, UE 115 receives, from the base station, a first multicast transmission associated with a first multicast transmission grant of the plurality of multicast transmission grants. For example, UE 115 may receive a first GC-PDSCH transmission associated with a first GC-PDCCH transmission grant.

In block 506, UE 115 determines a first feedback codebook for transmitting ACK/NACK feedback associated with the first multicast transmission to the base station. For example, the UE 115 may generate a feedback report for the first GC-PDSCH transmission. The generated feedback report may be used to generate the first feedback codebook to be reported.

In block 508, UE 115 holds reporting to the base station of the feedback codebook including the ACK/NACK for the first multicast transmission until a report triggering event is determined to occur. In aspects, holding reporting to the base station of the feedback for the GC-PDSCH transmissions may include the UE foregoing, or not transmitting the feedback codebook including ACK/NACK for the GC-PDSCH transmissions.

In block 510, UE 115 determines whether the report triggering event has occurred. In implementations, the report triggering event may include receiving a subsequent GC-PDCCH transmission grant with a valid K1 (e.g., a K1 that is not an NNK1), receiving a valid K1 in a subsequent unicast PDCCH transmission grant, or receiving a UE-specific GC-PDCCH retransmission grant. In aspects, the UE receiving the valid K1 in the triggering event may use the valid K1 to determine a physical uplink control channel (PUCCH) resource in which to transmit the held feedback codebook transmission.

In block 512, UE 115, in response to a determination that a report triggering event has occurred may perform the actions in blocks 514 and 526. In block 514, UE 115 determines a feedback resource for reporting the feedback codebook to the base station based at least in part on a K1 associated with the triggering event.

In implementations, the triggering event may include receiving a valid K1, such as in a subsequent GC-PDCCH transmission grant, a UE-specific GC-PDSCH retransmission, or a UE-specific unicast PDSCH transmission. In these implementations, UE 115 may determine a feedback resource (e.g., a PUCCH resource), based on the valid K1 associated with the triggering event, in which to transmit the feedback codebook for not only the transmission associated with the transmission grant with the valid K1, but also for transmitting the held feedback codebooks for the GC-PDSCH transmissions associated with GC-PDCCH transmission grants that include the NNK1. In these implementations, the PUCCH resource determined by UE 115 based on the valid K1 may be used to transmit the combined feedback codebook from UE 115. In aspects, the combined feedback codebook may be generated by UE 115 by multiplexing the feedback codebooks for the GC-PDSCH transmissions associated with GC-PDCCH transmission grants that include the NNK1 with the feedback codebook for the transmission associated with the transmission grant with the valid K1. The combined feedback codebook may be the first feedback codebook.

In block 516, UE 115 transmits the first feedback codebook to the base station on the determined first feedback resource.

Figure 6:
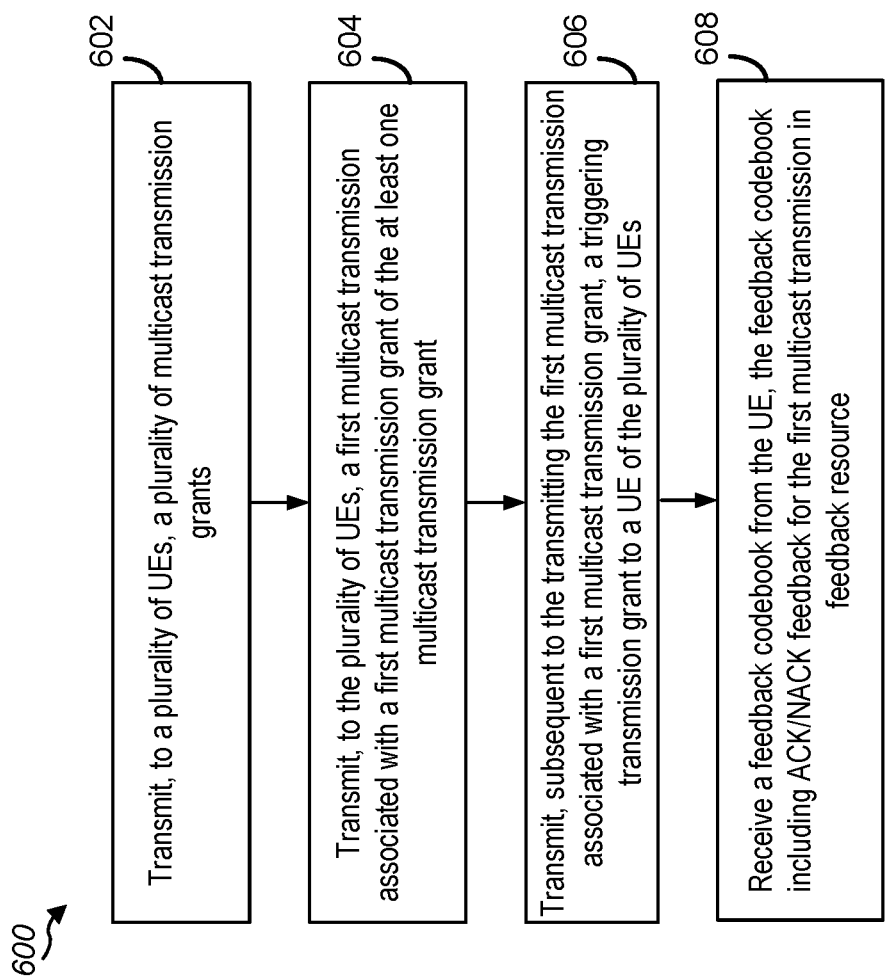
FIG. 6 is a flow diagram illustrating an example process 600 that supports management and control of feedback reporting of GC-PDSCH transmissions based on NNK1s indicated in associated GC-PDCCH transmission grants according to some aspects of the present disclosure

FIG. 6 is a flow diagram illustrating an example process 600 that supports management and control of feedback reporting of GC-PDSCH transmissions based on NNK1s indicated in associated GC-PDCCH transmission grants according to some aspects of the present disclosure. Operations of the process 600 may be performed by a base station, such as the base station 105 described above with reference to FIGS. 1-4 or a base station as described with reference to FIG. 8. For example, example operations of the process 600 may enable the base station 105 to control feedback for multicast (such as MBMS) transmissions in accordance with aspects of the present disclosure.

In block 602, base station 105 transmits, to a plurality of UEs, a plurality of multicast transmission grants. For example, the base station 105 may transmit a plurality of GC-PDCCH transmissions, each GC-PDCCH transmission granting a GC-PDSCH transmission to the plurality of UEs. In aspects, each of the multicast transmission grants may include an NNK1. In implementations, the UE may not use the NNK1 to determine a feedback resource (e.g., the NNK1 may not be a non-valid K1 indication) for reporting the feedback for GC-PDSCH transmissions, but instead, the NNK1 may serve as an indication by the base station to the UE, that the UE is to hold transmission of the GC-PDSCH feedback.

In block 604, the base station 105 transmits, to the plurality of UEs, a first multicast transmission associated with a first multicast transmission grant of the at least one multicast transmission grant. For example, the base station 105 may transmit a first GC-PDSCH transmission associated with a first GC-PDCCH transmission grant of the plurality of GC-PDCCH transmission grants. In aspects, the first GC-PDSCH transmission may be addressed to the plurality of UEs.

In block 606, the base station 105 transmits, subsequent to the transmitting the first multicast transmission associated with a first multicast transmission grant, a triggering transmission grant to a UE of the plurality of UEs. In aspects, triggering transmission grant may be a report triggering event as described above. For example, the report triggering event may include transmitting a second GC-PDCCH transmission grant with a valid K1 (e.g., a K1 that is not an NNK1), transmitting a valid K1 in a subsequent unicast PDCCH transmission grant, or transmitting a UE-specific GC-PDCCH retransmission grant. In aspects, the UE receiving the valid K1 in the triggering event may use the valid K1 to determine a PUCCH resource in which to transmit the held feedback codebook transmission.

In block 608, the base station 105 receives at a feedback codebook from the UE of the plurality of UEs. In aspects, the feedback codebook may include ACK/NACK feedback associated with the first multicast transmission. For example, the base station 105 may receive a feedback codebook from UE 115 including ACK/NACK feedback associated with the first multicast transmission. In some aspects, the feedback codebook received from the UE may include the feedback codebooks for the GC-PDSCH transmissions associated with GC-PDCCH transmission grants that include the NNK1 held by the UE.

In some implementations, the feedback codebook received from UE 115 may additionally include ACK/NACK feedback for a second multicast transmission. For example, the base station 105 may transmit a second multicast transmission to the plurality of UEs. The UE 115 may generate ACK/NACK feedback for the second multicast transmission, and the feedback for the second multicast transmission may be multiplexed with the feedback for the first multicast transmission into a feedback codebook. UE 115 may hold the feedback codebook including feedback for the first and second multicast transmissions until the triggering event occurs. In response to determining that the triggering event has occurred, UE 115 may transmit the feedback codebook including feedback for the first and second multicast transmissions to base station 105.

Figure 7:
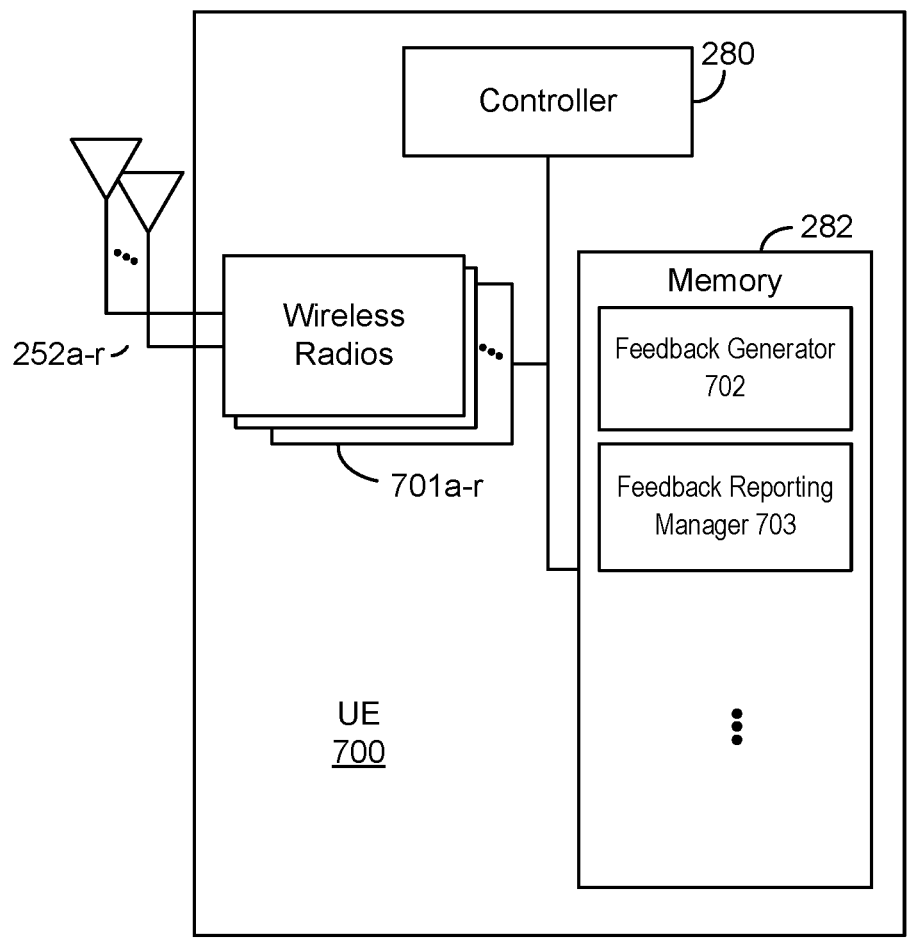
FIG. 7 is a block diagram of an example UE that supports reporting of feedback of GC-PDSCH transmissions based on NNK1s indicated in associated GC-PDCCH transmission grants according to some aspects of the present disclosure.

FIG. 7 is a block diagram of an example UE 700 that supports reporting of feedback of GC-PDSCH transmissions based on NNK1s indicated in associated GC-PDCCH transmission grants according to some aspects of the present disclosure. The UE 700 may be configured to perform operations, including the blocks of the process 500 described with reference to FIG. 5. In some implementations, the UE 700 includes the structure, hardware, and components shown and described with reference to the UE 115 of FIG. 2 or 3. For example, the UE 700 includes the controller 280, which operates to execute logic or computer instructions stored in the memory 282, as well as controlling the components of the UE 700 that provide the features and functionality of the UE 700. The UE 700, under control of the controller 280, transmits and receives signals via wireless radios 701*a-r* and the antennas 252*a-r*. The wireless radios 701*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

As shown, the memory 282 may include receive feedback generator 702 and feedback reporting manager 703. The feedback generator 702 may be configured to perform feedback generation operations, as described herein. The feedback reporting manager 703 may be configured to perform feedback resource determinations, feedback holding operations, and feedback releasing operations in accordance with the present disclosure. The UE 700 may receive signals from or transmit signals to one or more network entities, such as the base station 105 of FIGS. 1-4 or a base station as illustrated in FIG. 8.

Figure 8:
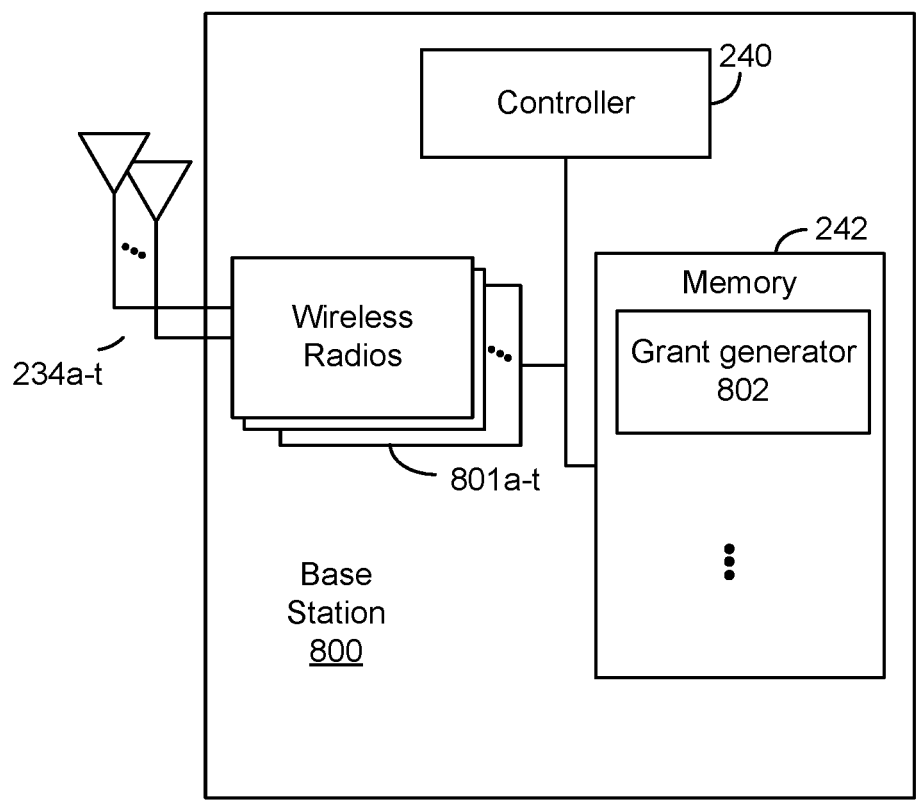
FIG. 8 is a block diagram of an example base station 800 that supports management and control of feedback reporting of GC-PDSCH transmissions based on NNK1s indicated in associated GC-PDCCH transmission grants according to some aspects of the present disclosure.

FIG. 8 is a block diagram of an example base station 800 that supports management and control of feedback reporting of GC-PDSCH transmissions based on NNK1s indicated in associated GC-PDCCH transmission grants according to some aspects of the present disclosure. The base station 800 may be configured to perform operations, including the blocks of the process 600 described with reference to FIG. 6. In some implementations, the base station 800 includes the structure, hardware, and components shown and described with reference to the base station 105 of FIGS. 1-4. For example, the base station 800 may include the controller 240, which operates to execute logic or computer instructions stored in the memory 242, as well as controlling the components of the base station 800 that provide the features and functionality of the base station 800. The base station 800, under control of the controller 240, transmits and receives signals via wireless radios 801*a-t* and the antennas 234*a-t*. The wireless radios 801*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include grant generator 802. Base station 800 may execute, under control of the controller 240, grant generator 802 stored in the memory 242. The execution environment of the transmit logic 1102 provides the functionality to perform grant generation operations, including configuration of NNK1 s in transmission grants, in accordance with aspects of the present disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
   at least one processor; and
   a memory coupled with the at least one processor and storing processor-readable code that, when executed by the at least one processor, is configured to:
      receive, from a base station, a plurality of multicast transmission grants addressed to a plurality of UEs, including the UE, each of the plurality of multicast transmission grants scheduling a multicast transmission and including a non-numeric feedback timing indicator (NNK1) for acknowledgement/negative-acknowledgement (ACK/NACK) feedback associated with a respective multicast transmission;
      receive, from the base station, a first multicast transmission associated with a first multicast transmission grant of the plurality of multicast transmission grants;
      determine, by the UE, a feedback codebook including ACK/NACK for the first multicast transmission for reporting to the base station;
      hold, by the UE, reporting to the base station of the feedback codebook including the ACK/NACK for the first multicast transmission until a report triggering event is determined to occur;
      determine, by the UE, whether the report triggering event has occurred; and
      in response to a determination that the report triggering event has occurred:
         determine, by the UE, a feedback resource for reporting the feedback codebook to the base station based at least in part on a feedback timing indicator (K1) associated with the report triggering event; and
         transmit, by the UE, the feedback codebook including the ACK/NACK for the first multicast transmission to the base station on the determined feedback resource.

2. The UE of claim 1, wherein the configuration of the processor-readable code to hold reporting to the base station of the feedback codebook includes configuration of the processor-readable code to forego transmission of the feedback codebook including the ACK/NACK for the first multicast transmission to the base station until the report triggering event is determined to occur.

3. The UE of claim 1, wherein the NNK1 for ACK/NACK feedback includes an invalid K1 that is not associated with a valid feedback resource in which the ACK/NACK is allowed to be transmitted.

4. The UE of claim 1, wherein the K1 associated with the report triggering event includes a valid K1 that is associated with a valid feedback resource in which the ACK/NACK for the first multicast transmission is allowed to be transmitted.

5. The UE of claim 1, wherein the configuration of the processor-readable code to determine whether the report triggering event has occurred includes configuration of the processor-readable code to:
   receive, by the UE, a second multicast transmission grant;
   determine whether the second multicast transmission grant includes control information with a valid K1; and determine, in response to a determination that the second multicast transmission grant includes control information with a valid K1, that the report triggering event has occurred.

6. The UE of claim 5, wherein control information in the first multicast transmission grant includes a pointer to a downlink assignment index (DAI) counter.

7. The UE of claim 6, wherein the DAI counter is incremented each time a transmission grant with an NNK1 is granted by the base station.

8. The UE of claim 7, wherein the DAI counter is reset in response to transmission, from the base station, of the second multicast transmission grant including the control information with the valid K1.

9. The UE of claim 1, wherein the configuration of the processor-readable code to determine whether the report triggering event has occurred includes configuration of the processor-readable code to:
receive a unicast transmission grant associated with a unicast transmission; and
determine, in response to receiving the unicast transmission grant, that the report triggering event has occurred.

10. The UE of claim 9, wherein the processor-readable code is further configured to:
determine a feedback codebook including ACK/NACK for the unicast transmission for reporting to the base station; and
multiplex the feedback codebook including the ACK/NACK for the unicast transmission with the feedback codebook including the ACK/NACK for the first multicast transmission.

11. The UE of claim 10, wherein the processor-readable code is further configured to:
determine a priority associated with the unicast transmission;
multiplex the feedback codebook including the ACK/NACK for the unicast transmission with the feedback codebook including the ACK/NACK for the first multicast transmission based on the priority associated with the unicast transmission being a first priority; and
forego multiplexing the feedback codebook including the ACK/NACK for the unicast transmission with the feedback codebook including the ACK/NACK for the first multicast transmission based on the priority associated with the unicast transmission being a second priority different than the first priority.

12. The UE of claim 10, wherein the configuration of the processor-readable code to multiplex the feedback codebook including the ACK/NACK for the unicast transmission with the feedback codebook including the ACK/NACK for the first multicast transmission includes configuration of the processor-readable code to:
concatenate the feedback codebook including the ACK/NACK for the unicast transmission with the feedback codebook including the ACK/NACK for the first multicast transmission.

13. The UE of claim 12, wherein the processor-readable code is further configured to:
receive a retransmission of a multicast transmission associated with a multicast transmission grant of the plurality of multicast transmission grants, and wherein the feedback codebook including the ACK/NACK for the unicast transmission further includes ACK/NACK for the retransmission of the multicast transmission.

14. The UE of claim 13, wherein the ACK/NACK for the retransmission of the multicast transmission is one of:

multiplexed with the feedback codebook including the ACK/NACK for the unicast transmission; and
concatenated to the feedback codebook including the ACK/NACK for the unicast transmission.

15. The UE of claim 1, wherein the configuration of the processor-readable code to determine whether the report triggering event has occurred includes configuration of the processor-readable code to:
receive a UE-specific retransmission grant of a multicast transmission associated with a multicast transmission grant of the plurality of multicast transmission grants, wherein the UE-specific retransmission grant is specifically addressed to the UE;
determine whether the UE-specific retransmission grant includes control information with a valid K1; and
determine, in response to a determination that the UE-specific retransmission grant includes control information with a valid K1, that the report triggering event has occurred.

16. The UE of claim 15, wherein the configuration of the processor-readable code to determine the feedback resource for reporting the feedback codebook to the base station includes configuration of the processor-readable code to:
determine the feedback resource for reporting the feedback codebook to the base station based on the valid K1 included in the control information of the UE-specific retransmission grant.

17. The UE of claim 1, wherein the processor-readable code is further configured to:
receive a UE-specific retransmission associated with the UE-specific retransmission grant;
determine a feedback codebook including ACK/NACK for the UE-specific retransmission for reporting to the base station; and
multiplex the feedback codebook including the ACK/NACK for the UE-specific retransmission with the feedback codebook including the ACK/NACK for the first multicast transmission.

18. The UE of claim 17, wherein the configuration of the processor-readable code to multiplex the feedback codebook including the ACK/NACK for the UE-specific retransmission with the feedback codebook including the ACK/NACK for the first multicast transmission includes configuration of the processor-readable code to:
concatenate the feedback codebook including the ACK/NACK for the UE-specific retransmission with the feedback codebook including the ACK/NACK for the first multicast transmission.

19. A base station comprising:
at least one processor; and
a memory coupled with the at least one processor and storing processor-readable code that, when executed by the at least one processor, is configured to:
transmit a plurality of multicast transmission grants addressed to a plurality of UEs, each of the plurality of multicast transmission grants scheduling a multicast transmission and including a non-numeric feedback timing indicator (NNK1) for acknowledgement/negative-acknowledgement (ACK/NACK) feedback associated with a respective multicast transmission;
transmit a first multicast transmission associated with a first multicast transmission grant of the plurality of multicast transmission grants;
transmit, subsequent to the transmitting the first multicast transmission associated with a first multicast transmission grant, a triggering transmission grant to a UE of the plurality of UEs; and receive a feedback codebook from the UE, the feedback codebook including ACK/NACK feedback for the first multicast transmission in feedback resource.

20. The base station of claim 19, wherein the NNK1 for ACK/NACK feedback includes an invalid K1 that is not associated with a valid feedback resource in which the ACK/NACK is allowed to be transmitted.

21. The base station of claim 19, wherein the triggering transmission grant to the UE includes a valid K1 that is associated with a valid feedback resource in which the ACK/NACK for the first multicast transmission is allowed to be transmitted.

22. The base station of claim 19, wherein the configuration of the processor-readable code to transmit the triggering transmission grant to the UE includes configuration of the processor-readable code to:
transmit a second multicast transmission grant, the second multicast transmission grant including control information with a valid K1.

23. The base station of claim 22, wherein control information in the first multicast transmission grant includes a pointer to a downlink assignment index (DAI) counter.

24. The base station of claim 23, wherein the DAI counter is incremented each time a transmission grant with an NNK1 is granted by the base station.

25. The base station of claim 24, wherein the DAI counter is reset in response to transmission, from the base station, of the second multicast transmission grant including the control information with the valid K1.

26. The base station of claim 19, wherein the configuration of the processor-readable code to transmit the triggering transmission grant to the UE includes configuration of the processor-readable code to:
transmit, to the UE, a unicast transmission grant associated with a unicast transmission.

27. The base station of claim 19, wherein the configuration of the processor-readable code to transmit the triggering transmission grant to the UE includes configuration of the processor-readable code to:
transmit, to the UE, a UE-specific retransmission grant of a multicast transmission associated with a multicast transmission grant of the plurality of multicast transmission grants, wherein the UE-specific retransmission grant is specifically addressed to the UE, the UE-specific retransmission grant including control information with a valid K1.

28. The base station of claim 27, wherein the valid K1 included in the control information of the UE-specific retransmission grant is associated with a feedback resource for reporting the feedback codebook from the UE.

29. A method for wireless communication performed by a user equipment (UE), the method comprising:
receiving, from a base station, a plurality of multicast transmission grants addressed to a plurality of UEs, including the UE, each of the plurality of multicast transmission grants scheduling a multicast transmission and including a non-numeric feedback timing indicator (NNK1) for acknowledgement/negative-acknowledgement (ACK/NACK) feedback associated with a respective multicast transmission;
receiving, from the base station, a first multicast transmission associated with a first multicast transmission grant of the plurality of multicast transmission grants;
determining, by the UE, a feedback codebook including ACK/NACK for the first multicast transmission for reporting to the base station;
holding, by the UE, reporting to the base station of the feedback codebook including the ACK/NACK for the first multicast transmission until a report triggering event is determined to occur;
determining, by the UE, whether the report triggering event has occurred; and
in response to a determination that the report triggering event has occurred:
determining, by the UE, a feedback resource for reporting the feedback codebook to the base station based at least in part on a feedback timing indicator (K1) associated with the report triggering event; and
transmitting, by the UE, the feedback codebook including the ACK/NACK for the first multicast transmission to the base station on the determined feedback resource.

30. A method of wireless communication performed by a base station, the method comprising:
transmitting a plurality of multicast transmission grants addressed to a plurality of UEs, each of the plurality of multicast transmission grants scheduling a multicast transmission and including a non-numeric feedback timing indicator (NNK1) for acknowledgement/negative-acknowledgement (ACK/NACK) feedback associated with a respective multicast transmission;
transmitting a first multicast transmission associated with a first multicast transmission grant of the plurality of multicast transmission grants;
transmitting, subsequent to the transmitting the first multicast transmission associated with a first multicast transmission grant, a triggering transmission grant to a UE of the plurality of UEs; and
receiving a feedback codebook from the UE, the feedback codebook including ACK/NACK feedback for the first multicast transmission in feedback resource.

* * * * *